United States Patent [19]
Siebenmann et al.

[11] Patent Number: 6,155,405
[45] Date of Patent: Dec. 5, 2000

[54] POWER TRANSMISSION DEVICE FOR TRANSMITTING THRUSTING FORCES

[75] Inventors: Dieter Siebenmann, Russikon; Werner Honegger, Baech, both of Switzerland

[73] Assignee: IPT Weinfelden AG, Weinfelden, Switzerland

[21] Appl. No.: 09/269,237

[22] PCT Filed: Sep. 17, 1997

[86] PCT No.: PCT/CH97/00345

§ 371 Date: Jun. 4, 1999

§ 102(e) Date: Jun. 4, 1999

[87] PCT Pub. No.: WO98/13281

PCT Pub. Date: Apr. 2, 1998

[30] Foreign Application Priority Data

Sep. 25, 1996 [CH] Switzerland .............................. 2338/96

[51] Int. Cl.[7] .................................................. B65G 35/08
[52] U.S. Cl. ...................... 198/795; 198/803.3; 198/730
[58] Field of Search ................................... 198/795, 800, 198/803.3, 725, 728, 730, 732

[56] References Cited

U.S. PATENT DOCUMENTS

| 3,407,920 | 10/1968 | Rauch ..................................... 198/730 |
| 3,844,400 | 10/1974 | Dehne ..................................... 198/795 |
| 5,139,131 | 8/1992 | Persson et al. ..................... 198/795 X |

FOREIGN PATENT DOCUMENTS

| 152 136 | 8/1985 | European Pat. Off. . |
| 399 103 | 11/1990 | European Pat. Off. . |
| 124 800 | 4/1919 | United Kingdom . |
| WO 86/01475 | 3/1986 | WIPO . |

*Primary Examiner*—James R. Bidwell
*Attorney, Agent, or Firm*—Pearne & Gordon LLP

[57] ABSTRACT

A transmission system for transmitting pushing forces along straight and curved paths includes a guide channel (1) and a line of transmission members (10) arranged in the guide channel. The transmission members are acted on by a drive. The transmission members (10) are in contact with each other at end contact faces where the contact faces are formed with mating ring-shaped ridge (11) and a ring-shaped groove, respectively. The ridge (11) and groove (12) are matched to each other such that they are positioned inside each other when the members are arranged coaxially and contacting each other. The cross sections of the ridge (11) and groove (12) are such that ridge and groove are pivotable in relation to each other when engaged. A line of such transmission members arranged in a straight line and pressure loaded forms a buckling-resistant bar which does not exert forces on straight regions (1.2) of an enclosing guide channel (1). In curved guide channel parts (1.1), the transmission members (10) are pivoted in relation to each other, the pivoting movement being a guided one and the pushing force is transmitted through more than a contact point in the pivoted arrangement.

12 Claims, 3 Drawing Sheets

POWER TRANSMISSION DEVICE FOR TRANSMITTING THRUSTING FORCES

FIELD OF THE INVENTION

This invention is in the field of force transmission devices and concerns a transmission means for transmitting pushing forces. The inventive transmission means is designed for pushing operation (i.e., pressure loadable) and for force transmission along a path which is selectable within broad limits, i.e., straight and also containing freely selectable curves.

BACKGROUND OF THE INVENTION

According to the state of the art, pressure loadable transmission means applicable for curved transmission paths as well as for straight transmission paths consist, e.g., of a series of transmission members guided in a suitable guide channel, the members being spherical or dumbbell-shaped. For a line of dumbbell-shaped members to be curveable in all directions, the contact faces of the members are convex as is the case with spherical members. This means that in both cases the transmission members are in contact with each other in a very small area (theoretically at one point) whether they are arranged in a straight line or in a curved line. The whole force is transmitted through this contact point. Therefore, a line of such transmission members, even a straight line, is very unstable and tends to buckle. Because of buckling, the members exert radial forces on the guide means, even on a straight transmission path, resulting in a considerable loss of force through friction and requiring a strong design of the guide means.

In the publication U.S. Pat. No. 3,518,051, a force transmission means of this general type having spheres as force transmission members is described. Publication U.S. Pat. No. 3,968,861 describes a force transmission means of a similar type with dumbbell-shaped transmission members. These members have convex contact faces and, for reducing friction, comprise rollers rolling on rolling surfaces of the guide means.

The publications CH-646762 (or U.S. Pat. No. 4,397,145) and CH-656683 describe force transmission means in the form of chains which are pressure or tension loadable and which comprise mutually connected transmission members of a substantially spherical form. Such chains also buckle easily in straight-line pushed operation and, therefore, must be guided correspondingly.

SUMMARY OF THE INVENTION

An object of the invention is to provide a transmission means for transmitting pushing forces over freely selectable paths, i.e. curved or straight paths, which transmission means comprises a line of transmission members arranged in a guide channel. The inventive force transmission means is, compared to known means, able to be operated more efficiently, i.e. with smaller loss of force. The force transmission means is, all the same, producible in a simple way, even when relatively small, and it is driveable with known driving means such as, e.g., cogwheels, worm gears or hydraulic or pneumatic cylinders.

The inventive force transmission system achieves the above object using transmission members which, when arranged in a straight line and pressed against each other, form the equivalent of a bar which is considerably more resistant to buckling than the lines of spheres or of dumbbell-shaped members with convex contact faces as described above. Due to their resistance to buckling, the members of such a bar cause minimum friction on the guide means as long as they are arranged in a straight line. This not only reduces the necessary operation energy but also leads to less costly guide channels, having reduced requirement of loadability and precision, and in which, in specific areas, operation is even possible without a guide channel.

The inventive force transmission system comprises a line of transmission members and a guide channel in which the members are slidably moved by a drive. The end faces of the members which are in contact with each other are designed such that the members, in coaxial orientation, form a buckling resistant bar, i.e. the faces are designed such that:

in a straight line of members, two adjacent members contact each other in a contact area (not in a contact point), wherein the contact area has no spherical symmetry (no ball and socket joint), extends as far as possible away from the member axis and is formed such that the resultant of the transmitted force lies on the axis of each member (buckling resistant bar of members);

a force acting on a straight line of members is advantageously transmitted from one member to the neighboring member mainly in radially outer regions of the contact area (further stabilization of the buckling stable bar of elements), when arranged in contact with each other, the members are centered and kept in a coaxial relationship (promoting prevention of buckling, eccentric force transmission), when the members are dislocated from a straight line, the members are pivoted relative to each other in a guided manner (maintaining the centered arrangement); and advantageously also in a curved line, force is transmitted from one member to the next one through an area somewhat greater than only a touching point.

Of the two contact faces of two neighboring members facing each other in a line of members of the inventive force transmission means, one comprises an annular ridge in a radially outer area and the other one has a corresponding annular groove or at least a half groove. Thereby, the ridge and groove have matched cross sections with a circular arcuate profile, at least in the region of the top of the ridge and of the base of the groove (ridge:convex arch; groove:concave arch). This means that the ridge lies in the groove when the members are in a coaxial arrangement and there is a contact area between them. It further means that when the members pivot out of a coaxial position, this movement is guided due to the fact that the ridge pivots inside the groove.

When the matched ring-shaped grooves and ridges are circular, it is possible to pivot the transmission members in any desired direction. In such a case, the contact area between two members is constituted by at least part of the groove or ridge surface in a coaxial arrangement, and is reduced to a contact line running perpendicular to the groove and ridge when the members are pivoted.

When the ring-shaped grooves and ridges have the form of polygons, the possible pivoting directions are restricted to directions perpendicular to the polygon sides, wherein in the pivoted position a contact surface between ridge and groove is maintained along one polygon side.

The grooves and corresponding ridges and/or the centers of the faces are advantageously shaped such that the centers of the faces of two coaxially arranged members are not in contact with each other, i.e. so that no force is transmitted through the center.

The groove-and-ridge form of the contact faces acts in a centering manner. The transmission members of the inventive transmission means are pivotable in relation to each other in any direction (circular groove and ridge) or in a plurality of predetermined directions (polygon-shaped groove and ridge) and still, when in a straight line, the members transmit force like a bar, i.e. the line of members shows considerable resistance to buckling. Due to shifting the load to radially outer regions of the faces, the resistance to buckling is additionally increased. Due to the circular arcuate profile of the ridge top and the groove base, a guided pivoting movement of two neighboring members is made possible, in which movement the members are maintained centered. Two pivoted members are in contact along at least a contact line as opposed to a contact point between two spheres or two spherical faces.

The guide channel of the inventive force transmission means takes up the force in curved regions. In straight regions, however, it merely serves as a trap for the transmission members and possibly for taking up external radial forces acting on the transmission members. Because a straight line of members of the inventive force transmission means acts like a pressure-loaded bar, the guiding function of the guide channel becomes virtually unnecessary in such areas and the channel can be designed correspondingly.

The transmission members of the inventive force transmission means can, depending on the application, be totally independent of each other or they can be mutually connected. Suitable connection means are designed to be flexible in a way that permits pivoting of the members in relation to each other. The connection means can at the same time have an additional, centering function and/or a position restoring function, i.e. be designed such that they force the members back into a coaxial orientation.

BRIEF DESCRIPTION OF THE DRAWINGS

Embodiments of the inventive force transmission means are described in more detail with reference to the following drawings wherein.

DESCRIPTION OF PREFERRED EMBODIMENTS

Figure 1:
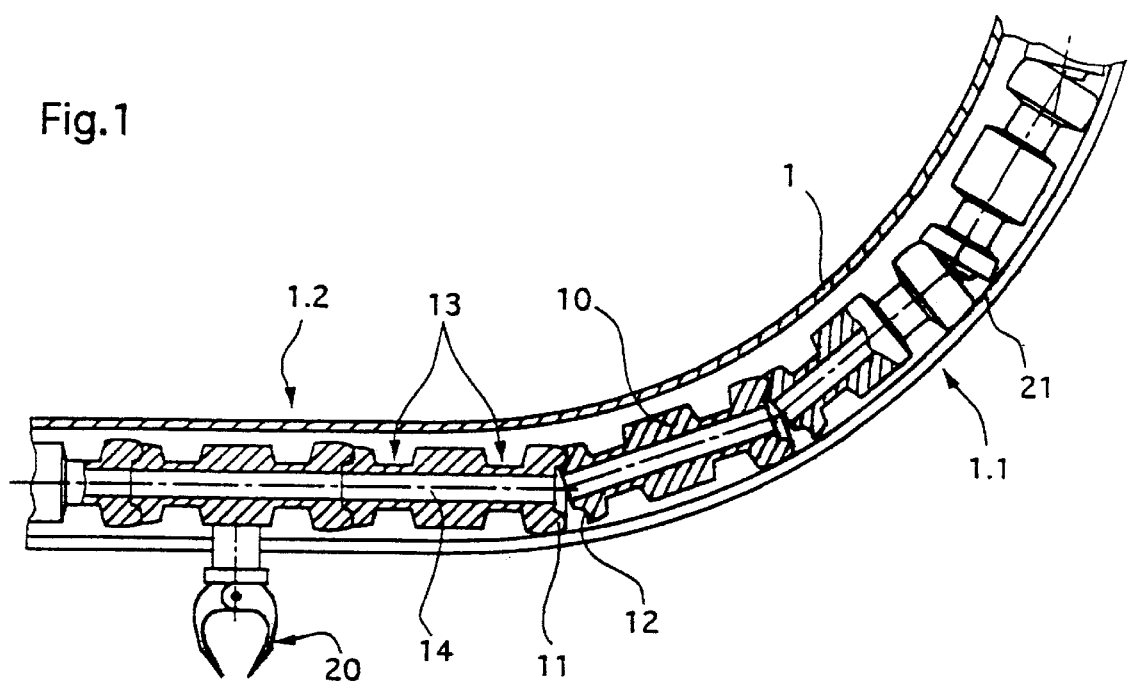
FIG. 1 is a partial sectional view of an embodiment of the inventive force transmission means, partly sectioned parallel to the axis of the guide channel.

FIG. 1 shows a part of an embodiment of a force transmission means in accordance with the invention. A guide channel 1 has curved and straight regions 1.1 and 1.2, respectively. The guide channel is sectioned along its axis. In guide channel 1 is a line of transmission members 10, shown partly in section along their axes.

Transmission members 10 comprise, as described above, two contact faces each, one end being formed with an annular circular ridge 11 and the other end being formed with a corresponding annular circular groove 12. In order to allow mutual pivoting of the members around an axis perpendicular to the axis of the members, the outer wall of the groove is reduced. Of course, it is possible also to form a line of alternating members of two types, one type being formed with grooves on both contact faces and the other type being formed with ridges on both contact faces.

The shapes of transmission members 10 between the end faces is not relevant to the invention. If, e.g., the members are to be driven with a cog-wheel or a similar driving means, they must have a form which can be gripped by the driving means, e.g., comprising one or two locations (indicated generally at 13) having a reduced cross section. If the members are to be movable around curves which are relatively tight relative to the member length, the members are advantageously shaped like dumbbells with substantially spherical ends.

The transmission members may comprise an axial bore 14. This displaces force transmission to the radially outer region of the groove and ridge and, in addition, may receive a cable for transmission of electric power or electric signals to a predetermined location on the line of members, the cable being loosely laid through the line of members. Such a cable can additionally take over the function of a loose connection of the transmission members (see also FIG. 6).

As an example for an application, a gripper 20 is shown arranged on one of the transmission members, which gripper protrudes through a slot-shaped opening 21 in guide channel 1 to the outside and with which gripper, e.g., objects are movable along the path of guide channel 1.

FIG. 1 shows clearly how the transmission members form a stable bar when they are arranged in a straight line as seen in the left-hand part of the figure. This is due to the fact that, at least in the region of groove and ridge positioned inside each other, the members are in contact with each other and they are held in a stable, centered position. It can also be seen from FIG. 1 that the members are displaced toward the radially outside portion of the channel in its curved region, which region of the channel must be able to take up the resulting forces. In opposition to this, the guide channel does not perform a guiding function in straight region 1.2 (the members do not touch the guide channel in this region, as shown). The guide channel is to fulfill stability requirements on the outsides of curves only and there are hardly any requirements concerning precision of the inner channel cavity in relation to the radial extension of the transmission members.

Figure 2:
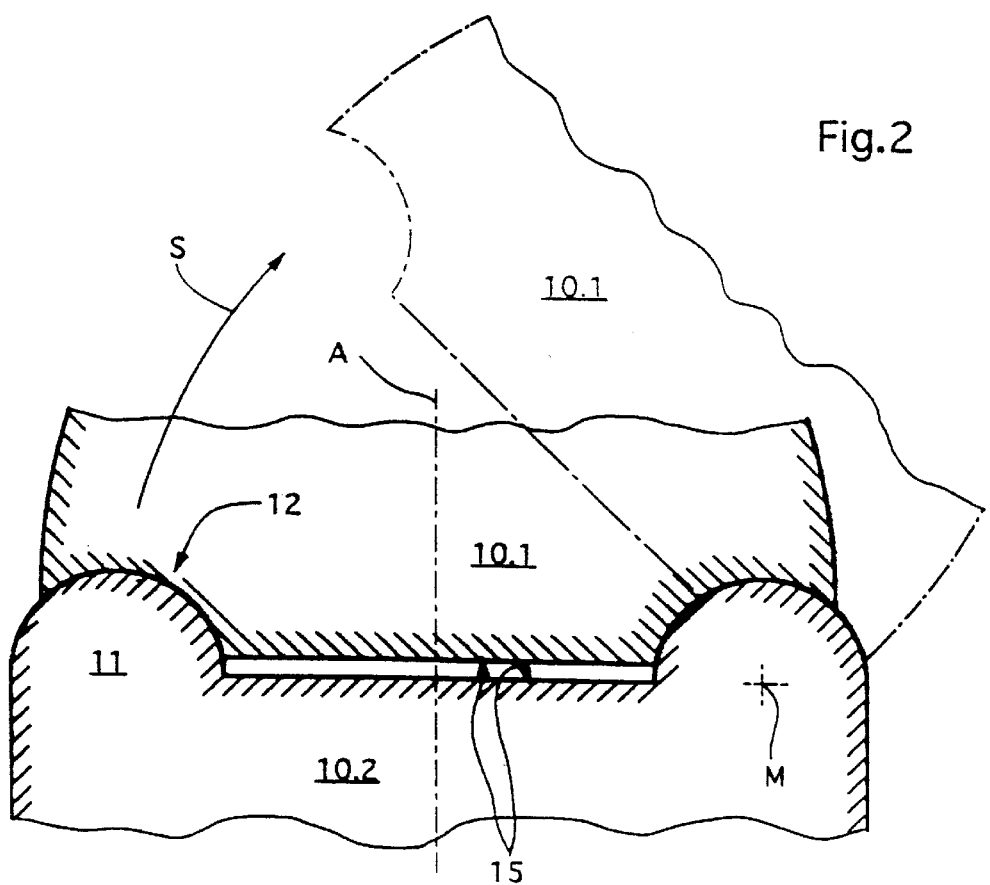
FIG. 2 is an enlarged longitudinal sectional view through the contact area between two neighboring transmission members of an inventive force transmission means which are shown coaxially (in unbroken lines) and pivoted in relation to each other (in broken lines)

FIG. 2 shows, on a larger scale, the contact region between two neighboring, abutting transmission members 10.1 and 10.2, again in a section along their axis A, the transmission members being substantially similar to those in FIG. 1. Of member 10.1, the face with groove 12 is shown, and of member 10.2 is shown the face with ridge 11. Member 10.1 is shown in unbroken lines in a coaxial position in relation to member 10.2 and in broken lines, in a position pivoted in relation to member 10.1. The pivoting symbolized by the arrow S is guided by the at least partly circular arcuate profile of the cross sections of groove and ridge. A defined pivoting axis M extends through the center of this circle. During pivoting, groove and ridge remain engaged. For circular groove and ridge, their contact during pivoting is theoretically restricted to a radial line perpendicular to the pivoting axis and lies in the section plane of FIG. 2.

Transmission members 10.1 and 10.2 according to FIG. 2 differ from the transmission members according to FIG. 1 in that they do not comprise an axial bore (14). For still displacing force transmission to the radially outer regions of the contact faces, ridge 11 is advantageously higher than the depth of groove 12. Thus, contact in central region 15 of the faces and force transmission in this central region is prevented.

Figure 3:
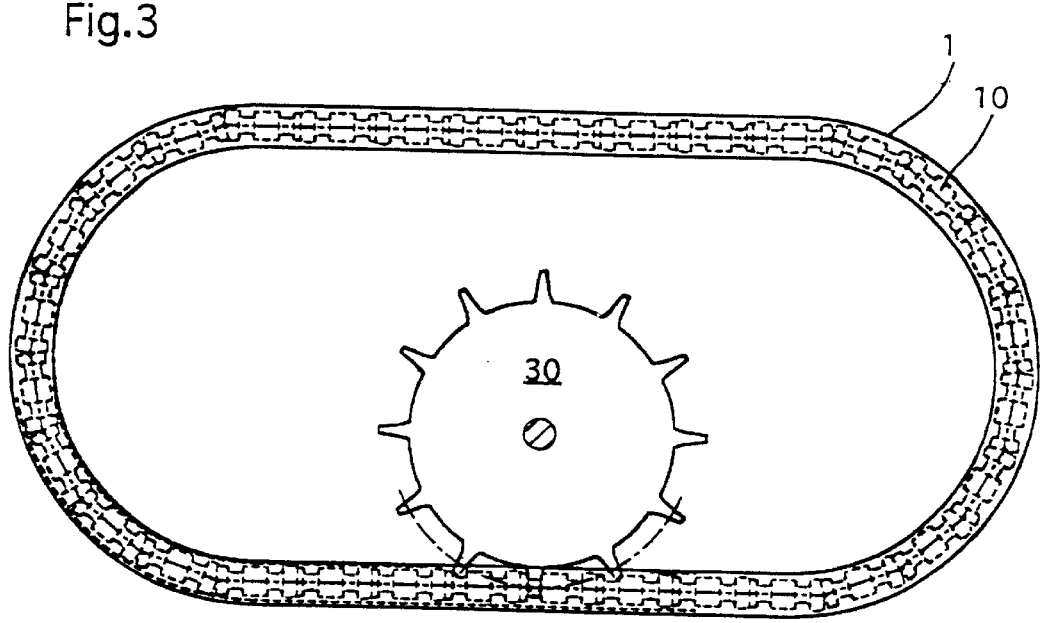
FIGS. 3 and 4 are schematic views of two applications of the inventive force transmission means.

FIG. 3 shows an application of the inventive force transmission means. It is an endless loop of a guide channel 1 closed on itself in which loop the transmission members 10 are arranged in such a number that they touch each other. Members 10 are moved pushing each other in one or the other direction in guide channel 1 by means of a chain wheel 30 the cogs of which reach into a suitable opening in guide channel 1 to interact with the transmission members. Guide channel 1 can, e.g., comprise a slot-shaped opening (21, FIG. 1) extending over its whole length through which opening grippers arranged on the members protrude outwardly (20, FIG. 1) for moving objects around the whole loop, 30 through part of the loop or to and fro over part of the loop.

The channel loop of FIG. 3 consists of two straight parts connected by two curved parts, all parts being arranged in a plane. obviously, the loop can have any form, i.e., it is not a condition for it to be arranged in a plane.

Figure 4:
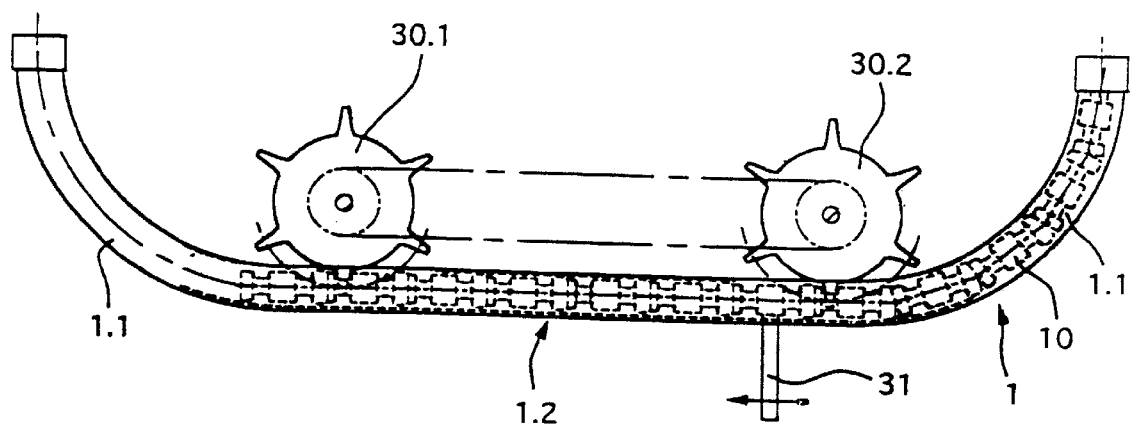

FIG. 4 shows a further application of the inventive force transmission means. The guide channel is not closed on itself and comprises between two curved regions 1.1, a straight region 1.2. At the two ends of the straight part, two mutually coupled drive wheels 30.1 and 30.2 are provided for acting on the line of transmission members arranged in the channel.

The force transmission means according to FIG. 4, e.g., serves for displacing a part 31 of the device (shown very schematically) or several such parts to and fro. The total length of guide channel 1 and the cumulative length of the line of transmission members arranged in the channel is selected such that the line reaches at least from one drive wheel to the other one (30.1 or 30.2, respectively) when the part of the device is in one of the predetermined extreme positions. The curved parts 1.1 of the guide channel are orientated such that transmission members 10 located therein are driven by gravity toward straight part 1.2. Thereby, the members are not exposed to any transmission force, i.e., there are virtually no friction and wearing forces either on the curved channel parts nor on the straight channel part.

For the application shown in FIG. 4, a correspondingly driven bar could be used instead of the line of transmission members. Function and operation characteristics of the bar between the two driving wheels 30.1 and 30.2 would be exactly the same as the function of the bar formed by the transmission members. The advantage of the inventive force transmission means compared to the bar is the curved channel ends 1.1, which constitute, especially in the case of a long straight part, a considerable amount of space saved.

Figure 5:
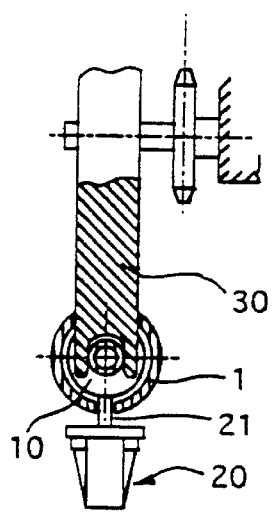
FIG. 5 is a transverse sectional view of an inventive force transmission means in the region of a drive.

FIG. 5 shows a cross section through a driving wheel 30 gripping into the guide channel and cooperating with a transmission member 10. A gripper 20 is arranged on transmission member 10, which gripper protrudes out of the guide channel through a slot-shaped opening 21.

Figure 6:
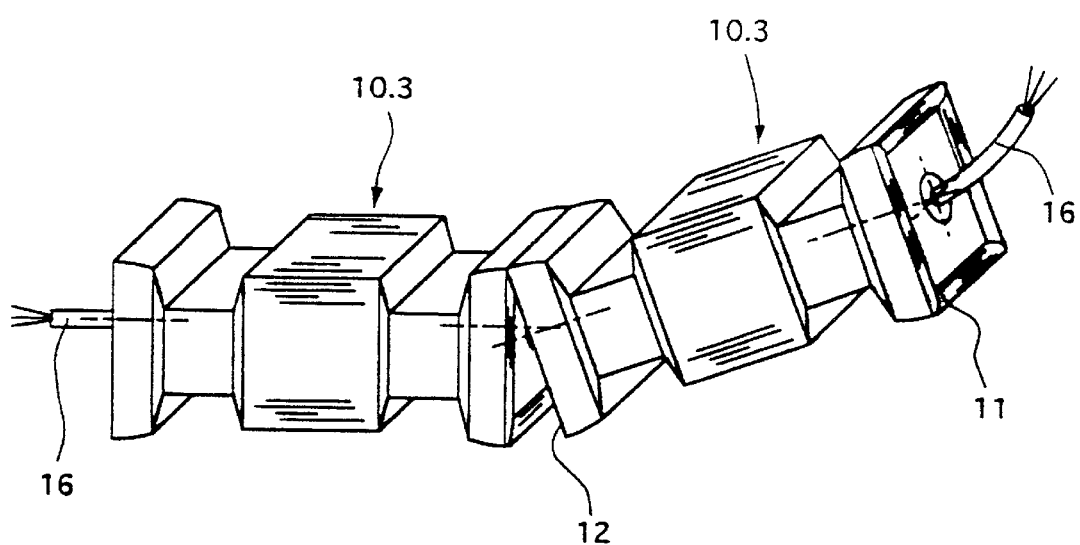
FIG. 6 is a perspective view of transmission members of an inventive force transmission means with polygon-shaped faces.

FIG. 6 shows two transmission members 10.3 pivoted in relation to each other. Contrary to the transmission members of FIGS. 1 and 2, the contact faces of the members are square and comprise a groove 12 or a ridge 11 respectively having the form of a quadrangular ring, although groove and ridge have, e.g., the same cross section as the ones shown in FIG. 2.

Compared to transmission members with circular grooves or ridges respectively, these members 10.3 can only be pivoted in a controlled manner in four directions at right angles to each other. For more pivoting directions, hexagonal, octagonal or generally polygon-shaped rings of ridge and groove are possible.

In FIG. 6, a cable 16 laid through the axial bores of the members is also shown as an example of a loose connection means for loosely connecting the transmission members.

Grooves and ridges on contact faces of transmission means designed to be polygon-shaped need not form a continuous ring. They can, e.g., be interrupted at the edges of the polygon.

Figure 7:
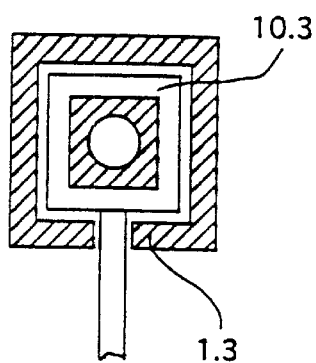
FIGS. 7 and 8 are schematic transverse sectional views of inventive force transmission means with members substantially according to FIG. 6.
Figure 8:
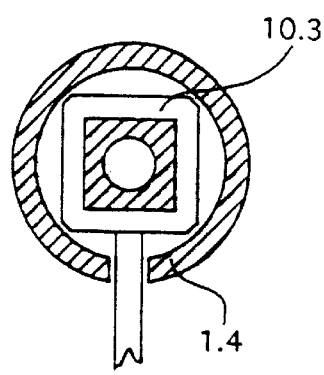

FIGS. 7 and 8 show in cross section, transmission members 10.3 substantially according to FIG. 6 positioned in a guide channel 1.3 or 1.4, respectively. These figures show that the transmission members 10.3 having a square face are applicable in square guide channels (1.3) as well as in circular ones (1.4). In a guide channel with a round cross section it is advantageous to provide means for maintaining the rotational alignment of the transmission members.

We claim:

1. A transmission system for transmitting pushing forces along straight and curved paths comprising a guide channel;

a plurality of transmission members movable in said guide channel;

a drive coupled to said transmission members for moving said transmission members in at least one direction in said guide channel;

each of said transmission members comprising contact faces for contacting adjacent transmission members and transmitting forces from said drive, each said contact face having a center and including at least one of a generally annular ridge and a generally annular groove, said ridges and grooves being spaced radially outwardly from said center on each contact face;

said transmission members being positioned so that a ridge on a contact face matingly engages with a groove on an abutting contact face and so that force is transmitted through said ridges and grooves from said drive through said transmission members; and said mating ridges and grooves being shaped so that a transmission member is pivotable relative to an abutting transmission member with said ridge and groove engaged.

2. A transmission system according to claim 1 wherein each said ridge comprises an arcuate cross-section and each said groove has an arcuate cross-section of substantially the same radius as said ridge.

3. A transmission system according to claim 1 wherein each said ridge and groove is generally circular.

4. A transmission system according to claim 1 wherein each said ridge and groove is polygonal.

5. A transmission system according to claim 1 wherein, when adjacent ones of said contact faces are abutting, said centers of said contact faces are spaced apart.

6. A transmission system according to claim 1 including connection means for loosely interconnecting said transmission members with each other.

7. A transmission system according to claim 6 wherein said transmission members comprise an axial bore.

8. A transmission system according to claim 7 wherein said connection means comprises a cable through said axial bores of said transmission members.

9. A transmission system according to claim 1 wherein said drive comprises a chain wheel having cogs engaging reduced cross-section portions of said transmission members, said guide channel having an opening for said chain wheel.

10. A transmission system according to claim 1 wherein said guide channel is mounted so that said transmission members are driven toward said drive by gravity.

11. A transmission system according to claim 1 wherein said guide channel comprises an endless loop and said transmission members have a cumulative length substantially equal to the length of said guide channel.

12. A transmission system according to claim 1 wherein said guide channel has two ends, said system comprising two drives spaced a distance apart, and wherein the cumulative length of said transmission members is less than the length of said guide channel.

* * * * *